(12) United States Patent
Rolia et al.

(10) Patent No.: US 9,361,405 B2
(45) Date of Patent: Jun. 7, 2016

(54) SYSTEM AND METHOD FOR SERVICE RECOMMENDATION SERVICE

(75) Inventors: Jerome Rolia, Kanata (CA); Mark Jacobsen, Galway (IE); Gary Moloney, Galway (IE); Steven J. Simske, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 94 days.

(21) Appl. No.: 13/703,148

(22) PCT Filed: Jun. 30, 2010

(86) PCT No.: PCT/US2010/040577
§ 371 (c)(1),
(2), (4) Date: Dec. 10, 2012

(87) PCT Pub. No.: WO2012/002951
PCT Pub. Date: Jan. 5, 2012

(65) Prior Publication Data
US 2013/0086099 A1    Apr. 4, 2013

(51) Int. Cl.
*G06F 17/30* (2006.01)
*G06F 21/62* (2013.01)

(52) U.S. Cl.
CPC ........ *G06F 17/3097* (2013.01); *G06F 17/3089* (2013.01); *G06F 21/6227* (2013.01)

(58) Field of Classification Search
CPC .......... G06F 17/3064; G06F 17/30964; G06Q 10/11
USPC .......... 707/713, 757, 802, 777, 767; 709/201, 709/225, 229
See application file for complete search history.

(56) References Cited

U.S. PATENT DOCUMENTS

| | | | |
|---|---|---|---|
| 6,029,195 A * | 2/2000 | Herz | 707/999.01 |
| 6,366,915 B1 | 4/2002 | Rubert et al. | |
| 6,460,029 B1 * | 10/2002 | Fries et al. | 707/999.003 |
| 6,513,031 B1 * | 1/2003 | Fries et al. | 707/999.003 |
| 6,601,059 B1 * | 7/2003 | Fries | 707/999.003 |

(Continued)

FOREIGN PATENT DOCUMENTS

| | | |
|---|---|---|
| CN | 1419208 A | 5/2003 |
| CN | 1761962 A | 4/2006 |

(Continued)

OTHER PUBLICATIONS

Sun Microsystems, Inc., Introduction to Cloud Computing Architecture, White Paper 1st Edition, Jun. 2009, Santa Clara, California, USA.

(Continued)

*Primary Examiner* — Baoquoc N To
(74) *Attorney, Agent, or Firm* — Hewlett Packard Enterprise Patent Department

(57) ABSTRACT

The present disclosure includes a system and method for a service recommendation service. A method for a service recommendation service includes determining one or more queries that do not expose additional data items stored in a data source of a participant in a collaborative information system than are exposed by queries already implemented on the participant's data source. Query services that are not authorized to involve the data source, but which use the determined one or more queries are identified. The identified query services are recommended to the participant.

12 Claims, 11 Drawing Sheets

(56) References Cited

U.S. PATENT DOCUMENTS

| | | |
|---|---|---|
| 6,606,657 B1 | 8/2003 | Zilberstein et al. |
| 6,769,032 B1 | 7/2004 | Katiyar et al. |
| 6,961,687 B1 | 11/2005 | Myers et al. |
| 6,961,688 B2 | 11/2005 | Bankes |
| 7,010,607 B1 | 3/2006 | Bunton |
| 7,080,139 B1 | 7/2006 | Briggs et al. |
| 7,188,158 B1 | 3/2007 | Stanton et al. |
| 7,225,197 B2 * | 5/2007 | Lissar et al. ............. 707/700 |
| 7,240,114 B2 | 7/2007 | Karamanolis et al. |
| 7,248,592 B1 | 7/2007 | Snider |
| 7,472,120 B2 | 12/2008 | Denny et al. |
| 7,657,493 B2 | 2/2010 | Meijer et al. |
| 7,889,670 B2 * | 2/2011 | Casey et al. ............. 370/252 |
| 8,185,733 B2 | 5/2012 | Schwartz et al. |
| 8,200,979 B2 | 6/2012 | Nadalin et al. |
| 8,316,045 B1 * | 11/2012 | Breau ............. G06F 17/30557 |
| | | 707/770 |
| 8,484,699 B2 | 7/2013 | Nadalin et al. |
| 9,135,559 B1 * | 9/2015 | Chan ............. G06N 5/02 |
| 2002/0065802 A1 | 5/2002 | Uchiyama |
| 2002/0087496 A1 | 7/2002 | Stripe et al. |
| 2002/0147724 A1 * | 10/2002 | Fries et al. ............. 707/100 |
| 2002/0174000 A1 | 11/2002 | Katz et al. |
| 2003/0177481 A1 | 9/2003 | Amaru et al. |
| 2003/0220901 A1 | 11/2003 | Carr et al. |
| 2004/0030611 A1 | 2/2004 | Byrne |
| 2004/0122958 A1 | 6/2004 | Wardrop |
| 2005/0149496 A1 | 7/2005 | Mukherjee et al. |
| 2006/0075120 A1 | 4/2006 | Smit |
| 2006/0248045 A1 | 11/2006 | Toledano et al. |
| 2007/0094230 A1 | 4/2007 | Subramaniam |
| 2008/0028036 A1 | 1/2008 | Slawson et al. |
| 2008/0033831 A1 | 2/2008 | Boss et al. |
| 2008/0052205 A1 | 2/2008 | Dolley et al. |
| 2008/0080526 A1 | 4/2008 | Gounares et al. |
| 2008/0126379 A1 | 5/2008 | Jain et al. |
| 2008/0133531 A1 | 6/2008 | Baskerville et al. |
| 2008/0168135 A1 | 7/2008 | Redlich et al. |
| 2008/0189758 A1 | 8/2008 | Akeel et al. |
| 2008/0208820 A1 | 8/2008 | Usey et al. |
| 2008/0243637 A1 | 10/2008 | Chan et al. |
| 2008/0243784 A1 | 10/2008 | Stading |
| 2008/0250026 A1 | 10/2008 | Linden et al. |
| 2008/0313148 A1 | 12/2008 | Kuerschner et al. |
| 2008/0313162 A1 | 12/2008 | Bahrami et al. |
| 2009/0064025 A1 | 3/2009 | Christ |
| 2009/0083240 A1 | 3/2009 | Nolan |
| 2009/0112851 A1 | 4/2009 | Watanabe |
| 2009/0254572 A1 | 10/2009 | Redlich et al. |
| 2009/0307339 A1 | 12/2009 | Setnes et al. |
| 2009/0327225 A1 | 12/2009 | Parra et al. |
| 2010/0049745 A1 | 2/2010 | Aebig et al. |
| 2010/0074123 A1 * | 3/2010 | Casey et al. ............. 370/252 |
| 2010/0145994 A1 | 6/2010 | Chang et al. |
| 2010/0161619 A1 | 6/2010 | Lamere et al. |
| 2010/0211490 A1 * | 8/2010 | Itoh ............. G06F 17/30545 |
| | | 705/34 |
| 2010/0250497 A1 | 9/2010 | Redlich et al. |
| 2011/0055202 A1 | 3/2011 | Heimendinger |
| 2011/0060838 A1 * | 3/2011 | Yeung ............. H04L 29/12066 |
| | | 709/228 |
| 2011/0080863 A1 * | 4/2011 | Jiang et al. ............. 370/312 |
| 2011/0103561 A1 * | 5/2011 | Casey et al. ............. 379/93.02 |
| 2011/0161911 A1 * | 6/2011 | Schultz et al. ............. 717/101 |
| 2011/0173546 A1 | 7/2011 | Nielsen et al. |
| 2011/0208801 A1 * | 8/2011 | Thorkelsson et al. ........ 709/203 |
| 2011/0225143 A1 | 9/2011 | Khosravy et al. |
| 2011/0231473 A1 | 9/2011 | Narayanan et al. |
| 2011/0258179 A1 | 10/2011 | Weissman et al. |
| 2012/0143630 A1 | 6/2012 | Hertenstein |
| 2012/0179703 A1 | 7/2012 | Ajitomi et al. |
| 2013/0166481 A1 | 6/2013 | Nowozin et al. |

FOREIGN PATENT DOCUMENTS

| | | |
|---|---|---|
| CN | 1856790 A | 11/2006 |
| CN | 101073094 A | 11/2007 |
| CN | 101188617 A | 5/2008 |
| CN | 201072263 Y | 6/2008 |
| CN | 101263492 A | 9/2008 |
| CN | 101354696 A | 1/2009 |
| CN | 101404078 A | 4/2009 |
| EP | 2194464 A1 | 6/2010 |
| JP | 2003208350 A | 7/2003 |
| KR | 20030014513 | 2/2003 |
| KR | 20040001336 A | 1/2004 |
| KR | 10-0436431 B1 | 6/2004 |
| WO | WO2005008358 A2 | 1/2005 |
| WO | WO-2010042859 A1 | 4/2010 |

OTHER PUBLICATIONS

European Patent Office, European Extended Search Report, Mar. 24, 2014, 10 pages, Munich, Germany.

Korean Intellectual Property Office, International Search Report, Mar. 15, 2011, 9 pages, Daejeon, Republic of Korea.

Peter Mell et al: "The NIST Definition of Cloud Computing", Internet Citation, Jul. 10, 2009, pp. 1-2, XP002552552.

Rajkumar Buyya et al: Cloudbus Toolkit for Market-Oriented Cloud Computing, Dec. 1, 2009, Cloud Computing, Springer Berlin Heidelberg, Berlin, Heidelberg, pp. 24-44, XP019135551.

Aniruddha N. Udipi et al.—"Rethinking DRAM design and organization for energy-constrained multi-cores"—Proceeding u SCA '1 O Proceedings of the 37th annual international symposium on Computer architecture—Newsletter ACM SIGARCH.

Gerd Frick, Klaus D. Muller-Glaser—"A Virtual Project House Infrastructure for Distributed Development Processes"—EBusiness and Virtual Enterprises IFIP—The International Federation for Information Processing vol. 56, 2001, pp. 193-202.

Korean Intellectual Property Office, International Search Report, Mar. 22, 2011, 3 pages, Daejeon, Republic of Korea.

Korean Intellectual Property Office, International Search Report, Mar. 25, 2011, 3 pages, Daejeon, Republic of Korea.

Korean Intellectual Property Office, International Search Report, Mar. 31, 2011, 3 pages, Daejeon, Republic of Korea.

Li, J., et al., Managing Data Retention Policies at Scale, Integrated Network Management (IM), 2011 IFIP/IEEE International Symposium, May 23-27, 2011, pp. 57-64.

Supplementary European Search Report, European Patent Application No. 10854213.5, Feb. 18, 2016, 7 pages.

Supplementary European Search Report, European Patent Application No. 10854216.8, Apr. 11, 2014, 7 pages.

Supplementary European Search Report, European Patent Application No. 10854218.4. Dec. 22, 2014, 6 pages.

* cited by examiner

SYSTEM AND METHOD FOR SERVICE RECOMMENDATION SERVICE

CROSS REFERENCE TO RELATED APPLICATIONS

The present application is related to (1) PCT Application Ser. No. PCT/US2010/040608, entitled "System and Method for Collaborative Information Services," filed on Jun. 30, 2010, (2) PCT Application serial number PCT/US2010/040584, entitled "System and Method for Serialized Data Service," filed on Jun. 30, 2010, (3) PCT Application serial number PCT/US2010/040592, entitled "System and Method for Automated Data Discovery Service," filed on Jun. 30, 2010, and (4) PCT Application serial number PCT/US2010/040597, entitled "System and Method for Self-Service Configuration of Authorization," filed on Jun. 30, 2010, the disclosures which are incorporated herein by reference.

BACKGROUND

Information can have great value. Assembling and maintaining a database to store information involves real costs. The costs can include the costs to acquire the information, the costs associated with the physical assets used to house, secure, and make the information available, and/or the labor costs to manage the information.

Some of the value of certain information may be derived from the fact that the information is not widely known (e.g., not shared). For example, a list of suppliers, their products and pricing, or a customer list, may be valuable to a manufacturing entity, which likely would not be inclined to share such information with its competitors. Conversely, some of the value of other information may be derived from the fact that the information is widely known (e.g., shared). For example, a library catalog is information that can be valuable to a community of users by being widely available, thereby saving time, effort, and perhaps money in trying to locate a particular item in a collection of items.

Some competitive information that principally derives value from not being widely known (e.g., among competitors and/or customers) may derive additional value were it shared with other entities in a limited manner. One such example is information related to a supply chain. A supply chain is a system of organizations, people, technology, activities, information and resources involved in moving a product or service from supplier to customer. Relationships of participants in a supply chain may include supplier-customer, and/or competitors, among others. Regulators and/or consumers may also have an interest in information concerning a particular supply chain. For example, information regarding the supply chain of a food product may be of interest to regulators and/or consumers.

It may be beneficial to share information on a limited basis to demonstrate that a certain component is not involved, or otherwise trace items and/or processes involved in the supply chain. It may be desirable to share information on a limited basis for studies that might benefit multiple supply chain entities and/or the consumers, or to prove or disprove some fact to regulators. Increased traceability can also limit the potentially huge economic and safety consequences of counterfeiting and defective products. For example, global food and/or brand name piracy concerns can cost the industry billions of dollars each year, and can cause the industry to implement anti-counterfeit technologies to protect products, brand and/or market. Recall is also a critical service where remedial activities are to be applied to a defective product or component thereof, making it desirable to identify locations of the affected product. Increased traceability along a supply chain can increase trust and limit the consequences of events closer to their source in a supply chain.

As information sharing systems expand to include more participants, more data sources, and more and different capabilities, remaining aware of new and changing capabilities can become challenging. Discovery of the new and changing information system capabilities can be a big challenge. Mechanisms to help educate participants to more fully understand and utilize the full range of capabilities of an information sharing system will beneficial.

DETAILED DESCRIPTION

Figure 1:
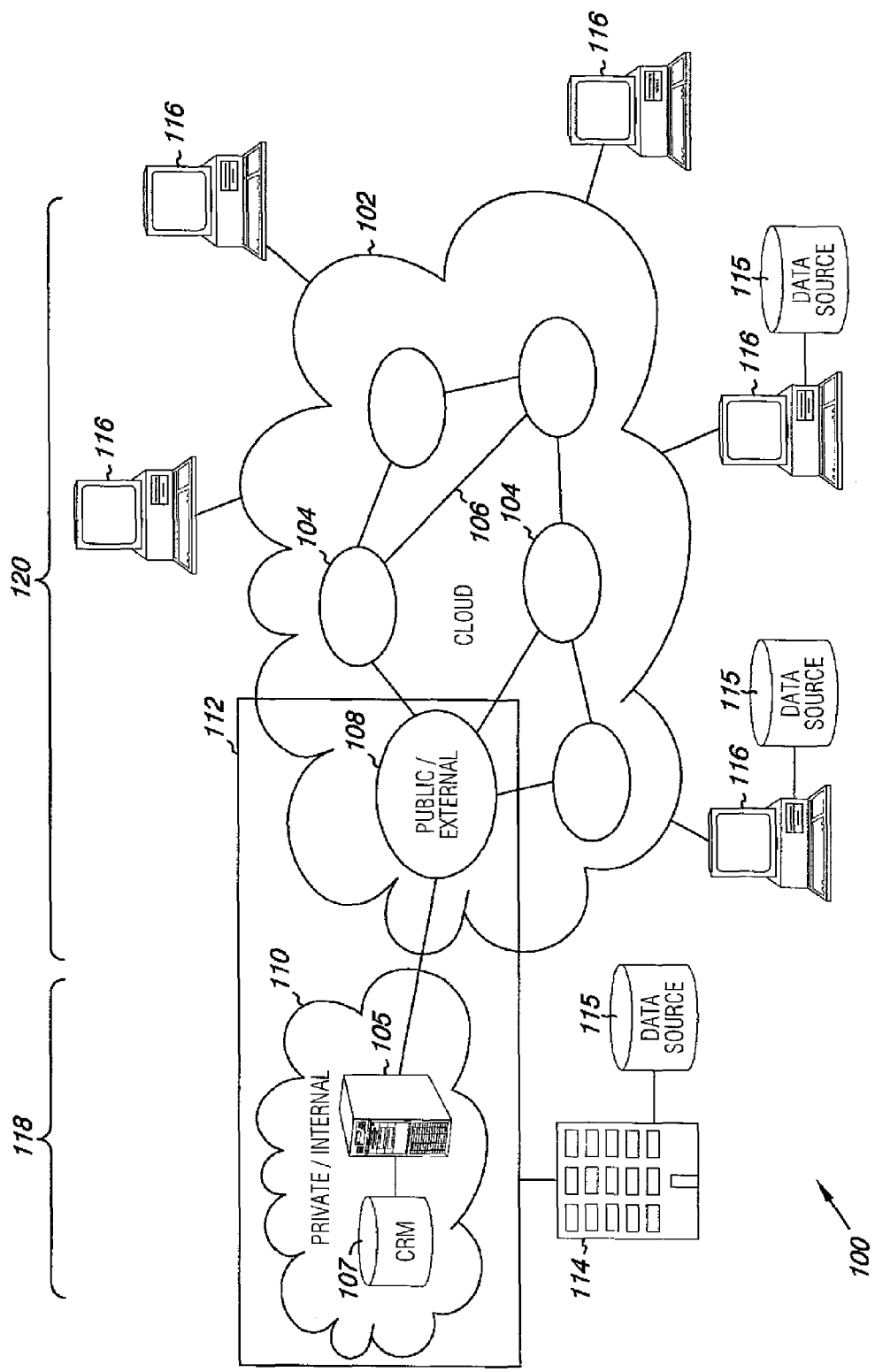
FIG. 1 is a diagram illustrating a computing system according to an example of the present disclosure.

The present disclosure includes a system and method for a service recommendation service. A method for a service recommendation service includes determining one or more queries that do not expose additional data items stored in a data source of a participant in a collaborative information system than are exposed by queries already implemented on the participant's data source. Query services that are not authorized to involve the data source, but which use the determined one or more queries are identified. The identified query services are recommended to the participant.

The collaborative information system of the present disclosure is arranged generally in a hub-and-spokes configuration, with a collaborative information services (CIS) computing platform programmed with query services as a hub, and participant data sources as the spokes. Participants in the collaborative information system make some portion of their respective data sources available to queries of other participants. According to the present disclosure, participants authorize query services with constrained data inputs and known output attributes. A query service is a group of one or more queries executed to ascertain information of interest. A query set is a number of queries that can be related to one another in some aspect. A query service may include queries from one or more query sets, or the queries comprising multiple query services may all be included in a single query set. That is, a query service may be a subset of one or more query sets, or multiple query services may be subsets of a single query set, depending on the queries comprising the query set(s) and the query service(s).

According to the collaborative information system of the present disclosure, attributes of each query service are defined prior to the query service being invoked by any participant. Each data source controlling entity must implement pre-defined queries of a query service to involve their respective data source. For example, the type of data and scope of data sources associated with a particular query service is pre-defined, the attributes of a respective query service being made available to participants so that they can determine whether, and to what extent, to expose their respective data source to the queries of a query service. That is, each query service is implemented using a "canned" group of queries that can be applied to a data source, if authorized by the control entity of the data source and the queries implemented on the respective data source. Similarly, scope, format, etc., of query results are also defined prior to a query service being invoked. Such a pre-defined result may be computed and mutually advantageous for the query invoker and data providers to share. It may obfuscate aspects of the data obtained by the embedded queries to compute intermediate results but that the data providers may not want or need to share directly. This may encourage providers to share more data with the knowledge that those invoking query services only have access to the possibly more limited computed results. Having pre-defined queries in terms of inputs and outputs enables collaborative information system participants to make informed decisions as to the type and extent of queries, and therefore query services, to which they are willing to allow their respective data source to be exposed.

According to the collaborative information system of the present disclosure, information needed for authorized results (e.g., raw data source data, intermediate computations, etc.) may or may not be presented to the participant that invokes a particular query service. In some previous approaches, the data being made available by each participant needed to be stored (e.g., duplicated to) a particular dedicated computing system storage media. However, the collaborative information system of the present disclosure does not require participant-contributed information to be maintained in a common, dedicated location. That is, the collaborative information system of the present disclosure enables participants to self-configure various authorization models that in turn control access of other participants to their data source(s). In this manner, dispersed data sources, including cloud based data sources, can be controlled to the degree desired by the data source control entity at their original location.

According to the collaborative information system of the present disclosure, authorization to access data of a data source is made with respect to query services of the collaborative information services computing platform, rather than peer-to-peer with each participant in the collaborative information system. Thus, the collaborative information system of the present disclosure enables self-configuration of authorizations by participants with fewer interventions by their IT staff. Also, automated and repeated discovery of information available from portions of the data sources available to the query services supports the efficient implementation of real time query services on a large scale.

FIG. 1 is a diagram illustrating a computing system according to an example of the present disclosure. The computing system shown in FIG. 1 is a networked computing system, such as a cloud computing system 100. Cloud computing system 100 is one example implementation of a networked computing system. However, examples of the present disclosure are not limited to a particular computing system configuration. By "cloud computing" is meant Internet-based computing that can effectively share physical computing resources, including software and/or information among a number of users. Cloud computing enables fine-grained provisioning of computing resources in real time to achieve dynamic scalability in response to varying data processing levels.

Cloud computing system 100 can include a private cloud 110 communicatively coupled to a public cloud 102. The public cloud 102 can include a number of computing resources 104 networked together by various communication channels 106, including first computing resources 104 external to a hybrid cloud 112 (discussed further below), and second computing resources external to the hybrid cloud 112. The computing resources 104 comprising the public cloud 102 can be of varying size and capability, may be respectively geographically dispersed from one another or be commonly located, and may be respectively owned and/or operated by any number of independent entities. The size, capabilities, and configuration of public cloud 102 can be dynamically changed as dictated by service level agreements, actual computing requirements, and for other factors applicable to cloud computing arrangements.

The term "public" refers to computing resources offered and/or available for use by entities (e.g., the public) other than the computing resource owners, usually in exchange for compensation (e.g., computing capability for hire). Computing resources 104 comprising the public cloud 102 may be owned by discrete entities, which may or may not be participants in a particular collaborative information system for which the computing resources are being employed.

A respective private owner/operator can make owner/operator-maintained computing resources available to the public for hire. The term "private" refers to computing resources dedicated for use by a limited group of users (e.g., one entity such as a company or other organization). That is, "private" is intended to mean reserved for use by some and not available to the public.

The private cloud 110 can be comprised of a number of computing resources 105. While a single server is shown in FIG. 1, the private cloud can be comprised of multiple computing resources 105. A computing resource 105 can include control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement. The control circuitry can have a structure that provides a given functionality, and/or execute computer-readable instructions that are stored on a non-transitory computer-readable medium 107. The non-transitory computer-readable medium 107 can be integral, or communicatively coupled, to a computing resource 105, in either in a wired or wireless manner. For example, the non-transitory computer-readable medium 107 can be an internal memory, a portable memory, a portable disk, or a memory located internal to another computing resource (e.g., enabling the computer-readable instructions to be downloaded over the Internet). The non-transitory computer-readable medium can have computer-readable instructions stored thereon that are executed by the control circuitry (e.g., processor) to provide a particular functionality.

The non-transitory computer-readable medium 107, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium 107 can include optical discs, digital video discs (DVD), high definition digital versatile discs (HD DVD), compact discs (CD), laser discs, and magnetic media such as tape drives, floppy discs, and hard drives, solid state media such as flash memory, EEPROM, phase change random access memory (PCRAM), as well as other types of machine-readable media.

A data source 115 owned by entity 114 (e.g., organization, natural person) can be part of private cloud 110, or as shown in FIG. 1, communicatively coupled to private cloud 110. That is, information under the control of organization 114 may be stored in the computing resources comprising private cloud 110, or be stored in memory accessible by private cloud 110. The data source 115 may be used in a collaborative information system, with organization 114 making some portion of the information stored in data source 115 available to other participants in the collaborative information system, as is further described below.

Although not shown in FIG. 1 for clarity, private cloud 110 can also include a number of computing resources (e.g., physical resources, software, etc.), such as computing resources 104, networked together by various communication channels 106. The computing resources of private cloud 110 can be homogeneous or of varying size and capability, may be geographically dispersed from one another or be commonly located, and may be owned and/or operated by one or any number of independent entities that dedicate some or all of their computing resources for the private use of one entity (e.g., organization 114). The size, capabilities, and configuration of the private cloud can change as dictated by service level agreements, dynamic computing requirements, and other factors applicable to cloud computing arrangements.

A portion 118 of cloud computing system 100 may be owned by organization 114, and another portion 120 of cloud computing system 100 may be owned by entities other than organization 114. As such, in addition to being private, private cloud 110 may be referred to as an internal cloud as well (e.g., a cloud computing arrangement internal to organization 114 and dedicated to the private use of organization 114). Considerations regarding specific cloud computing system configuration may include security, logging, auditing/compliance, firewall boundary location, and/or company policy, among others. Organization 114 may maintain additional computing resources not dedicated to the private use of organization 114 (e.g., available for contract use by the public as part of a cloud).

A number of entities 116 may be users of the public cloud 102 (e.g., as a networked computing system). Some entities 116 may have data sources 115 that may be used in (e.g., made available for query by participants) a collaborative information system, and other entities 116 using the public cloud may participate in the collaborative information system (e.g., invoke queries) but not have, or make available, a data source to other participants. There are many products from a variety of different vendors that can implement data sources that may be used for collaborative information services via standard interfaces for data queries.

While cloud computing system 100 is illustrated in FIG. 1 as two communicatively coupled clouds (e.g., private and public), examples of the present disclosure are not so limited, and the method of the present disclosure can be implemented using a private cloud 110, public cloud 102, or a hybrid cloud 112 comprising some portion of the public cloud 102 and the private cloud 110 made available for such use.

Not all of the components and/or communication channels illustrated in the figures are required to practice the system and method of the present disclosure, and variations in the arrangement, type, and quantities of the components may be made without departing from the spirit or scope of the system and method of the present disclosure. Network components can include personal computers, laptop computers, mobile devices, cellular telephones, personal digital assistants, or the like. Communication channels may be wired or wireless. Computing devices comprising the computing system are capable of connecting to another computing device to send and receive information, including web requests for information from a server. A server may include a server application that is configured to manage various actions, for example, a web-server application that is configured to enable an end-user to interact with the server via the network computing system. A server can include one or more processors, and non-transitory computer-readable media (e.g., memory) storing instructions executable by the one or more processors. That is, the executable instructions can be stored in a fixed tangible medium communicatively coupled to the one or more processors. Memory can include RAM, ROM, and/or mass storage devices, such as a hard disk drive, tape drive, optical drive, solid state drive, and/or floppy disk drive.

The non-transitory computer-readable media can be programmed with instructions such as an operating system for controlling the operation of server, and/or applications such as a web page server. The collaborative information services (CIS) platform and/or applications (e.g., services and/or models) may be implemented as one or more executable instructions stored at one or more locations within volatile and/or non-volatile memory. Computing devices comprising the computing system implementing the collaborative information system may also include an internal or external database, or other archive medium for storing, retrieving, organizing, and otherwise managing data sources and/or the functional logic of the collaborative information system.

Computing devices comprising the computing system may also be mobile devices configured as client devices, and include a processor in communication with a non-transitory memory, a power supply, one or more network interfaces, an audio interface, a video interface, a display, a keyboard and/or keypad, and a receiver. Mobile devices may optionally communicate with a base station (not shown), or directly with another network component device. Network interfaces include circuitry for coupling the mobile device to one or more networks, and is constructed for use with one or more communication protocols and technologies. Applications on client devices may include computer executable instructions stored in a non-transient medium which, when executed by a processor, provide such functions as a web browser to enable interaction with other computing devices such as a server, and/or the like.

Figure 2A:
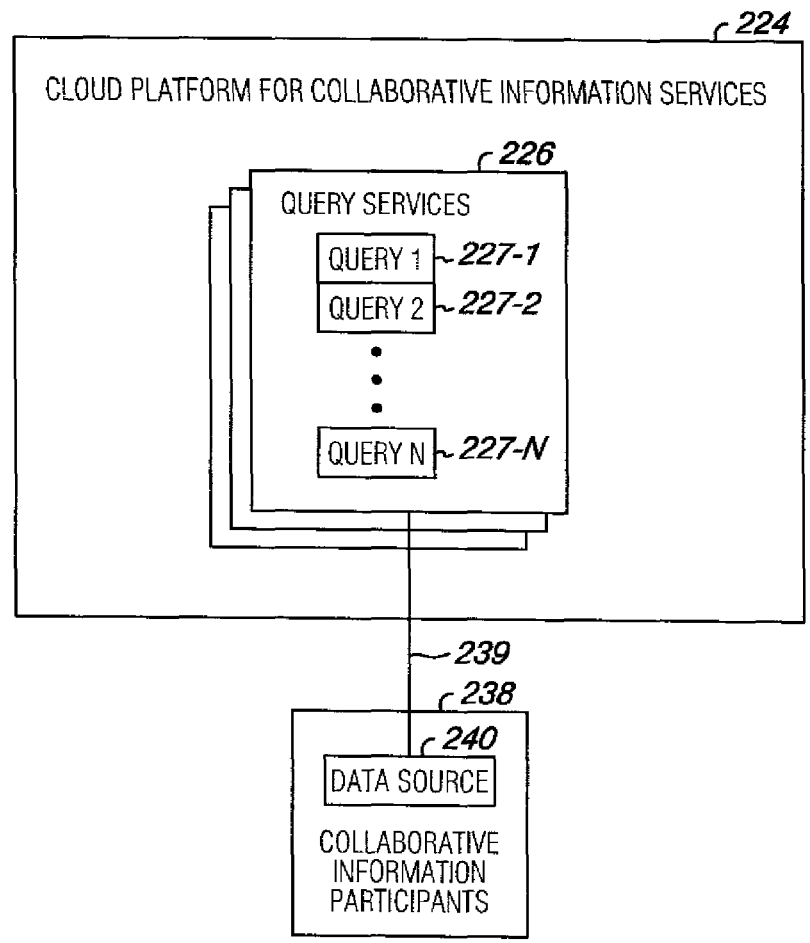
FIG. 2A is a diagram illustrating an example computing platform for providing collaborative information services according to an example of the present disclosure.

FIG. 2A is a diagram illustrating an example computing platform for providing collaborative information services according to an example of the present disclosure. The systems and methods of the present disclosure for collaborative information services are illustrated throughout this description with respect to a supply chain application of the collaborative information system. However, implementation of the collaborative information system of the present disclosure is not limited to supply chains, and other collaborative information service implementations are contemplated, including SaaS implementations.

A networked computing system implementing collaborative information services (CISs) can be applied to the information associated with a supply chain to provide a secure and trusted registry for supplier and customer information. Such a collaborative information system can act as a cache for information that connects services, partners, and customers. For example, suppliers may register products they sell with the collaborative information system, and customers may register products they use.

The collaborative information system can be used, for example, to provide a recall service upon a product associated with the supply chain. Information in the collaborative information system can cause recall messages to be sent to specific recipients (e.g., existing customers), rather than be broadcast generally (e.g., sent to potential customers as well). Recall messages can include detailed instructions appropriate for a particular recall, or series of recalls. Such a recall service could record the messages sent so that a supplier has the assurance that registered customers are notified.

A customer may also act as a supplier of a product that includes other products as parts. If one of the parts is recalled, then the customer may issue an additional recall via the collaborative information system for the composite product. In this way recall messages can traverse an appropriate portion of the supply chain without being over-, or under-, inclusive.

FIG. 2A illustrates an example architecture of a collaborative information system 222. For example, some, or all, of the participants in the supply chain of interest can be participants 238 in the collaborative information system 222. Collaborative information system participants 238 may have zero or more data sources 240 (e.g., databases, memory) that may be made available to the collaborative information system 222, and other participants 238 therein. Such data sources 240 can be widely deployed, owned and/or controlled by independent entities, and can be implemented with standard interfaces for sharing supply chain information. Some participants 238 of the collaborative information system 222 may not provide a data source to the collaborative information system 222 (e.g., have zero data sources). Some participants 238 of the collaborative information system 222 may participate by invoking query services without offering a data source. For example, regulators or consumers may be collaborative information system participants 238 without also being data source providers.

The collaborative information system 222 illustrated in FIG. 2A includes a CIS platform 224 communicatively coupled to a plurality of collaborative information participants 238 interconnected via a communication network 239, each participant 238 having a data source 240. According to an example embodiment, the collaborative information system 222 can be implemented by a networked computing system such as the cloud computing system 100 illustrated in FIG. 1, with the CIS platform 224 being implemented as a cloud platform. That is, the CIS platform can be implemented using geographically diverse and dynamically-configured computing resources.

The CIS platform 224 is communicatively coupled to the data sources 240 associated with participants in the collaborative information system via communication link 239. The CIS platform 224 is programmed with CISs 226 (e.g., query services). Each query service 226 is implemented using one or more queries (e.g., 227-1, 227-2, . . . , 227-N) operable on authorized portions of participant data sources 240. That is, each CIS can be a set of one or more queries involving the available data sources 240. A group of queries may be the same or different (e.g., more or less inclusive) than a query set, which is discussed further below. In other words, each query service may be implemented using a standardized group (e.g., "canned set") of queries. The CIS platform 224 is further programmed with indications from individual ones of the plurality of collaborative information participants 238 authorizing some portion of their data source 240 to be available to the one or more queries (e.g., 227-1, 227-2, . . . 227-N) defined by at least one query service 226. Participants 238 can make all or part of their data source available to all or part of a respective query, or query set. A participant 238 may require its IT staff to enable a query or query set. However, once enabled, the participant may then authorize additional query services that already have their required queries implemented without further involvement of the IT staff.

Figure 2B:
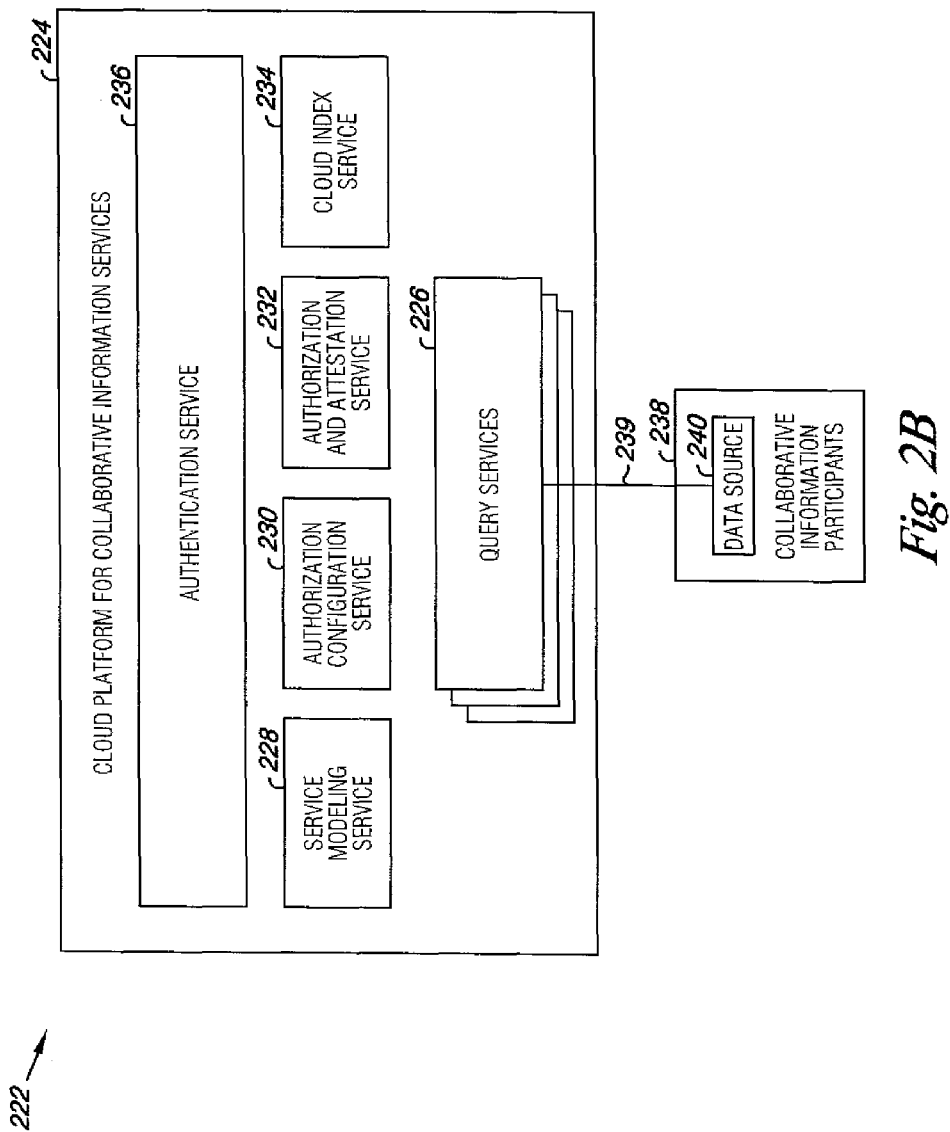
FIG. 2B is a diagram illustrating another example computing platform for providing collaborative information services according to an example of the present disclosure.

FIG. 2B is a diagram illustrating another example computing platform for providing collaborative information services according to an example of the present disclosure. In addition to the query services 226, the CIS platform 224 can be programmed with a service modeling service 228, an authorization configuration service 230, an authorization and attestation service 232, a cloud index service 234, and an authentication service 236.

The service modeling service 228 describes the queries issued by each query service 226, as well as the attributes (e.g., format, scope) of the output results by a respective query service 226. The authorization configuration service 230 is a portal that allows CIS participants to control the access to their data sources by query services 226 and/or individual queries. The authorization portion of the authorization and attestation service 232 ensures that just authorized queries by authorized query services 226 access participant data sources 240. The attestation portion of the authorization and attestation service 232 logs interactions of the various services and the participant's data sources 240, if desired by a participant 238, to serve as an audit trail. The cloud index service 234 maintains a cache of authorized information from data sources 240 that enable the efficient implementation of query services which require information for just a fraction of the potentially large number of data sources 240.

The CIS platform 224 is programmed (e.g., with executable instructions stored in a memory and executable on a processor) to implement the following functionality. Participants 238 in the collaborative information system 222 authenticate with the CIS platform 224 (e.g., peer-to-platform and platform-to-peer, together referred to as peer-to-platform-to-peer) rather than directly with each other (e.g., peer-to-peer). For example, a first participant 238 can authorize the CIS platform 224 to execute certain query services and/or queries on certain portions of the first participant's data sources 240, providing the query results in certain, specified ways (explained further below). The first participant 238 can further authorize the CIS platform 224 to permit certain other participants to invoke the authorized query services (and/or queries) on the authorized portions of the first participant's data sources 240.

Thereafter, another participant 238, if authorized by the platform as a result of the platform being authorized to permit the another participant 238, can cause the CIS platform 224 to invoke an authorized query service 226 (and/or queries). That is, the first participant can authorize a query, a query set, and/or a CIS, to involve portions of the first participant's data sources specified by the first participant corresponding to each query. Subsequently, one or more participant(s), if authorized with respect to the query, or query set and/or a query service, can then execute the query, a query set, and/or a query service, to involve portions of the first participant's data sources that the first participant specified corresponding to a respective query. In this manner, the first participant does not have to individually authorize (and monitor or control) each subsequent participant individually that wishes to execute the query, or query set and/or query service. Provisions are explained below for creating new queries and/or query services (i.e., groups of queries).

The peer-to-platform and platform-to-peer authorization functionality of the CIS platform 224 enables participants 238 to authorize CIS services that access data in standardized (e.g., known) ways instead of having to manage point-to-point data sharing rules among participants that can be typical of previous information sharing approaches. The peer-to-platform and platform-to-peer authorization relationship structure, effectively a hub-and-spokes configuration, enables greater scalability from the perspective of managing the collaborative information system arrangements. The peer-to-platform and platform-to-peer authorization relationship structure, and standardized querying with known query service result attributes, also enables greater data sharing while greatly reducing the risk of data mining by competitors.

Figure 3:
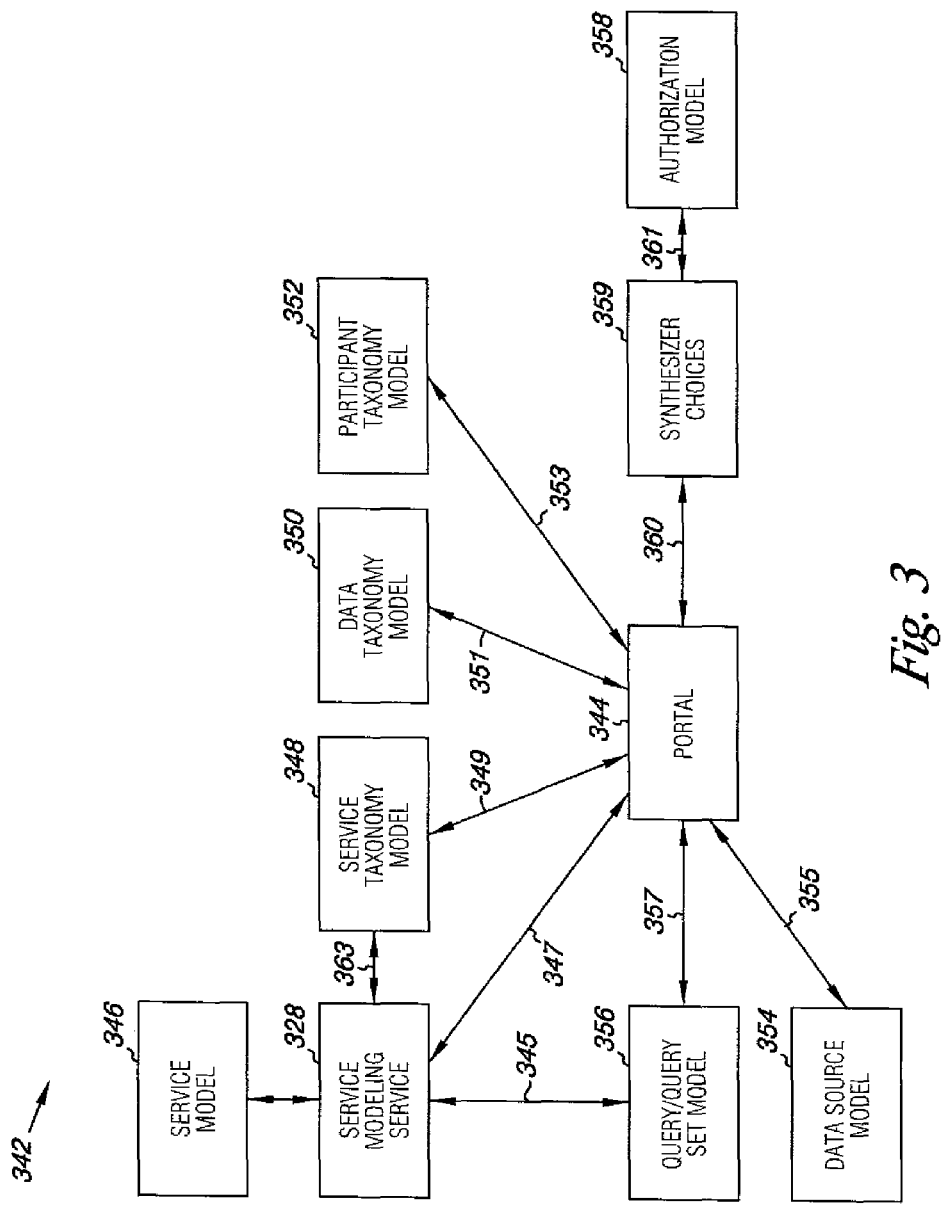
FIG. 3 is a diagram illustrating components of the collaborative information services platform according to an example of the present disclosure.

FIG. 3 is a diagram illustrating components of the collaborative information services platform according to an example of the present disclosure. A portal access system 342 includes a portal 344 communicatively coupled to a number of models and services. The portal 344 provides access to collaborative information system models that enable greater self-configuration by participants of the CIS platform (e.g., FIG. 2A at 224). Models refer to logic that may be implemented in hardware or by executable instructions stored in a memory and executable by a processor to perform a function. Participants configure models via the portal 344.

FIG. 3 shows portal 344 providing access to the service modeling service 323 via communication link 347. The service modeling service is communicatively coupled to a service model 346. An authorized service developer can use the portal 344 to manage the lifecycle of a particular service (e.g., a query service that relies on a set of one or more queries). The portal can support both human and programmatic interactions with the same level of functionality that includes the registration, categorization, and description of the service. The description of the service includes a description of the information used by the service (e.g., the queries), and the output provided by the service (e.g., the result attributes).

FIG. 3 shows portal 344 providing access to the service taxonomy model 348 via communication link 349. Participants can use the portal 344 to indicate which services in the service taxonomy model 348 they are willing to support for specific categories of data, and/or for particular locations of their data sources. The service taxonomy model 348 is communicatively coupled to the service modeling service 328 via communication link 363 such that they may exchange information. Services can be categorized to facilitate working with large numbers of services. For example, a participant may authorize a category of services instead of having to authorize a quantity of services individually. In addition, services properly added to a prior-authorized category may be authorized by virtue of the proper categorization to the authorized category.

Services can be categorized in hierarchies based on the service taxonomy model 348 that can reflect one or more of: type of service, type of result(s), and/or query/queries sets being executed to implement the service. Services can be related to other services, inherently or invoked by a participant in a related fashion (e.g., applying a logical function to the results of queries to arrive at a desired output). For example, a query service "A" may be implemented using queries that are a subset of a query service "B." As such, query services "A" and "B" are inherently related, with query service "A" being a child of query service "B." In another example, a participant may wish to interrogate data sources to find an output data set reflecting query service "C" AND query service "D." In this manner, the participant invokes queries "C" and "D" in a related fashion. In yet another example a second query service may be run in the results of a first query service, such as a downstream consumer service may be run on a service to create an upstream set of data which data providers are willing to share with consumers.

The service taxonomy model 348 can be set up to be static rule based, and/or can include conditional taxonomies. For example, a data provider may be willing to share data for query service "C" run alone. The data provider may also be willing to share data for query service "D" run alone. However, the data provider may feel that the results of query service "C" AND query service "D" reveal too much information regarding the relationship of certain data in the data provider's data source. Therefore, the service taxonomy model 348 can reflect that the results of query service "C" AND query service "D" are not available at all, or that certain portions of the results are summarized to a higher level that is not so revealing, or obfuscated in some manner acceptable to the data provider. Taxonomies concerning related services can also be referred to as conditional taxonomies.

Queries themselves are described in the language(s) supported by data sources. Participants that are data source providers must enable support for such queries for a service to be able to run on their data source. Query sets are sets of queries that are often performed together, and can be authorized subject to use of an appropriate conditional taxonomy. A service (e.g., a query service, discovery service, or other service) can be implemented (e.g., use) using one or more queries, one or more query sets, or portions of one or more query sets. Several different services may have queries that belong to a particular query set. Where a participant authorizes a particular query set to involve portions of the participant's data sources, the participant may also authorize any service having queries derived entirely from the authorized particular query set. By authorizing a number of query sets, a participant can choose to authorize a wide range of services derived from the number of query sets implemented to operate on their data sources without having to evaluate (and authorize) the services individually. According to some examples of the present disclosure, a participant having a data source (e.g., data provider) can implement query sets with respect to their data source and use taxonomy models) to authorize services using queries of the implemented query sets. According to some examples, a participant may revoke or conditionally modify authorization of certain services despite having authorized a query set that includes each of the queries of the service. An authorization may be conditionally modified using a conditional taxonomy. For example, the relationships between individual services may be obfuscated for the presentation of data for an individual service. Therefore, a combination of two or more services (e.g., by logical operation) may not be possible without additional constraints even if the services are available individually. That is, a "composite" service may have different participation/access rights pursuant to a conditional taxonomy.

FIG. 3 shows portal 344 providing access to the query/query set model 356 via communication link 357. Participants must implement the queries and or query sets that are required for the services they choose to authorize. Implementations for query sets for particular data source products can be made available for download to participants via the Query/Query Set model 356. The query/query set model 356 is communicatively coupled to the service modeling service 328 via communication link 345, for example, to communicate to services authorization of particular queries and/or query sets.

FIG. 3 shows portal 344 providing access to the data source model 354 via communication link 355. Not all data sources will categorize data according to the data taxonomy model 350. The data source model 354 addresses this issue. If a participant's data source labels data according to the taxonomy of the data taxonomy model 350, then queries of a service are constrained based on the taxonomy of the data taxonomy model 350. Otherwise, the query and/or results are further processed to correspond the participant's data source labels to the taxonomy (e.g., according to a default mapping or list).

FIG. 3 shows portal 344 providing access to the participant taxonomy model 352 via communication link 353. The participant taxonomy model 352 defines groups of participants, such as end-consumers, growers, maintenance providers, etc. A participant may be part of zero or more groups as defined in the participant taxonomy model 352. Groups of participants can be used to further govern rights over who is permitted to invoke certain services that involve the participant's own data. That is, a participant may authorize a service to involve their data source except where the service is invoked by a specified other participant, group of participants, and/or or invoked along with (e.g., aggregated with) another service. For example, one service might provide product location information, and another service might provide product count information. A data provider may allow for other participants to run either service individually, but disallow running the two services in aggregate with one another since doing so exposes too much information (e.g., a product count at each location). Or a participant may authorize a service to involve some portion of their data source where the service is invoked by one participant/group, and may authorize a service to involve some other (more or less or different) portion of their data source where the service is invoked by another participant/group.

FIG. 3 shows portal 344 providing access to the data taxonomy model 350 via communication link 351. The data taxonomy model 350 can be configured by a participant to further define a scope of access to the participant's data source with respect to certain categories of the data, which may be further qualified by certain participants. That is, a participant may limit some (or all) portions of their data source for a particular service. For example, a participant may limit a service to involve data from their data source that is publically reported, rather than not authorize the service at all. Or a participant my limit the scope of their data source to certain relevant kinds of data for a service invoked by a specified participant, and/or subject to additional constraints with respect to combining (e.g., aggregating) services.

FIG. 3 shows portal 344 providing access to the authorization model 358 via the synthesizer choices 359 and communication links 360 and 361. A participant's configuration of one or more authorizations are synthesized into the authorization model 358, which is used to govern access to the participant's data sources. A participant's authorization configuration specification can also be captured directly into the authorization model 358. The authorization model 358 governs access to the participant's data sources by limiting the access of respective query services by authorized other participants to specified portions of the participant's data sources.

A participant-configured authorization model makes it easier for a participant (e.g., any size organization) to support their own participation in the collaborative information system than was experienced with previous (e.g., peer-to-peer) approaches where more intervention may be needed from IT staff. An example of a service that supports self-configuration for participants and the platform is the discovery service, which is discussed further with respect to FIG. 5. Like other services, the discovery service must be authorized by a participant. Once authorized for execution by the CIS platform, the discovery service peruses the service models of the participant's other authorized services, recognizes the kinds of product category and/or product IDs that are considered in the queries, and then interacts with a participant's data sources to discover which products the participant supports in its supply chain. This information is cached in a cloud index to support the efficient operation of other authorized services. It guides the other authorized query services to participant data sources that are relevant for the query service. Without such a discovery service, participants have to specifically register information they choose to authorize. Thus, self-configuration can benefit both the participant providing a data source, as well as the participant(s) that might wish to invoke services involving the data source that can function more efficiently due to the previous discovery process.

The service developer can describe a service, such as a query service, in the service model 346 using the service modeling service 328. The service developer can configure the service model 346 to indicate the queries and/or query sets that are used by a query service, for example. Participants can access the service model 346 via the portal 344 to learn the queries and/or query sets that are used by a particular query service.

Figure 4:
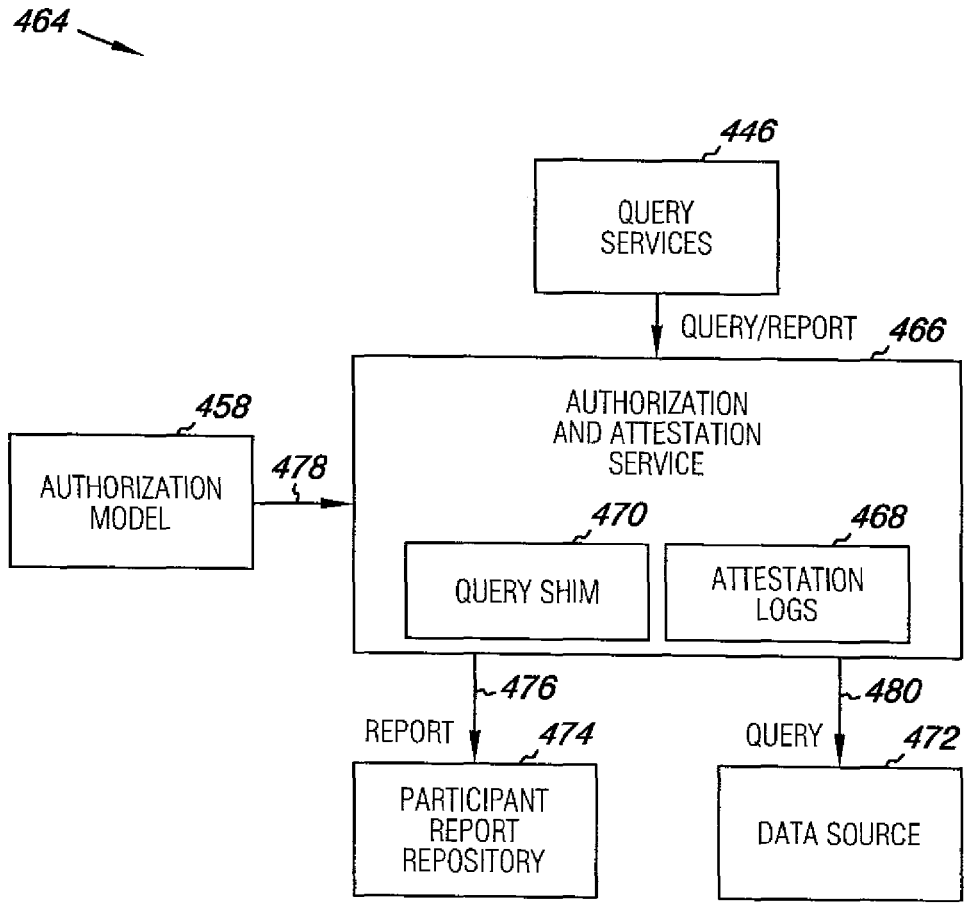
FIG. 4 is a diagram illustrating an authorization and attestation service for a computing platform according to an example of the present disclosure.

FIG. 4 is a diagram illustrating an authorization and attestation service for a computing platform according to an example of the present disclosure. Authorization logic 464 includes authorization and attestation service 466 having inputs from an authorization model 458 and query services 446, and providing outputs to data sources 472 and a participant report repository 474. The function of the authorization and attestation service 466 is to ensure that the CIS platform (e.g., services such as query services 446) perform authorized queries, for authorized participants, involving authorized data sources, and does not perform unauthorized queries, queries involving unauthorized portions of data sources for a respective query, and/or queries invoked by unauthorized entities (including unauthorized participants).

In addition, another function of the authorization and attestation service 466 is to maintain attestation logs 468 that can be used to audit interactions between participants and the platform and/or data sources. The authorization and attestation service can log queries and/or service invocations, among other activities that may be of interest, and can report results to participants and/or system administrators. According to one example embodiment, reports are stored in a participant report repository 474 via communication link 476.

The authorization and attestation service is guided by the authorization models 458 as may be self-managed by each participant, including service relationship rules expressed in a conditional taxonomy, as previously discussed. The authorization models 458 communicate with the authorization and attestation service 466 via a communication link 478. The authorization and attestation service 466 can include a query shim 470, a "shim" in the sense of being logic that fits between two other logic components so as to relate them (e.g., facilitate communication of useful information therebetween). The query shim 470 is programmed to ensure that just authorized queries are made upon data sources 472 (e.g., via communication link 480), and that just authorized results are returned to the invokers of services. Authorized results may not include raw data from the data sources, or intermediate results (e.g., results computed from the raw data) in response to invoking a service. Authorized results returned to a participant may format, organize, and/or summarize query raw data and/or intermediate results into higher-level authorized results that aggregate the raw data and/or intermediate results in order to maintain confidentiality of individual raw data, according to the service description. In this way, the raw data from a data source and computed intermediate results are not exposed to an invoker of a service unless they are included in the definition of results for a particular service. Thus, a data source provider is always aware of what data will be returned to an invoker of a service and can use the knowledge to direct its own authorization choices.

Figure 5:
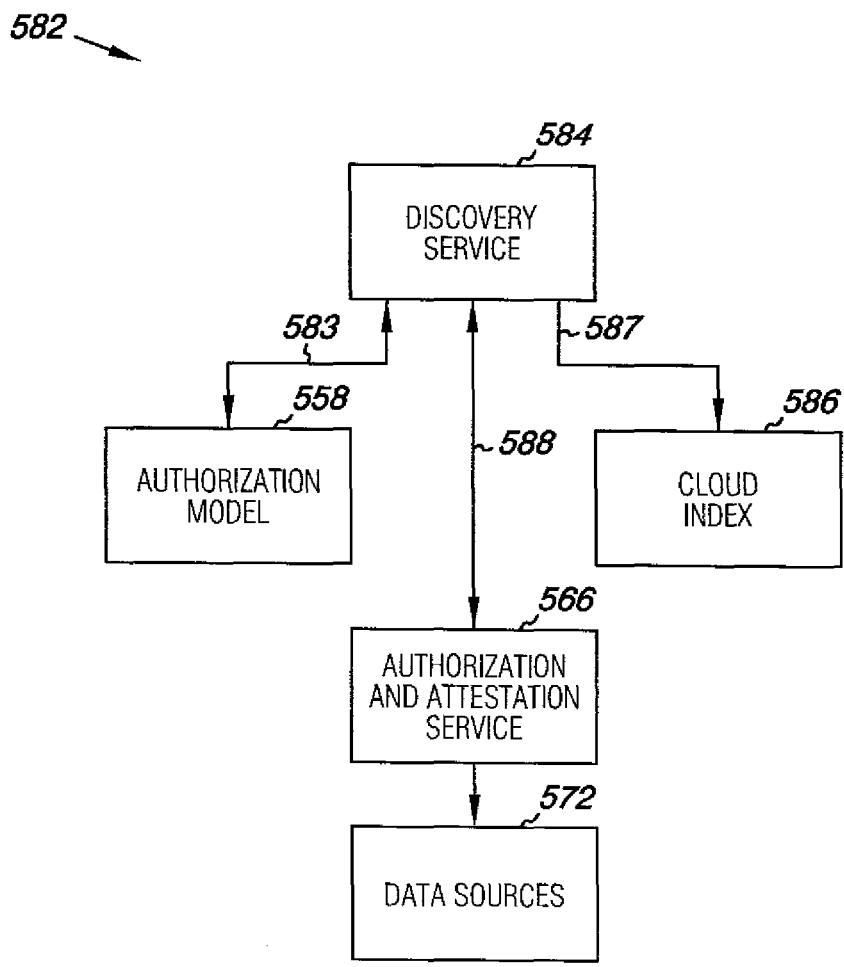
FIG. 5 is a diagram illustrating a discovery service for a computing platform according to an example of the present disclosure.

FIG. 5 is a diagram illustrating a discovery service for a computing platform according to an example of the present disclosure. Discovery logic 582 includes the discovery service 584 communicatively coupled to the authorization model 558 via communication link 583, and communicatively coupled to the authorization and attestation service 566 via communication link 588, and communicatively coupled to an index service 586 (e.g., a cloud index service) via communication link 587. The discovery service 584 inspects the authorization model 558 to find what services are authorized by a participant. The services authorized by a participant are determined from the authorization and attestation service 566.

The discovery service 584 also inspects the queries of services and builds information regarding the kinds of master and transactional data that may be accessed from a participant's data sources 572. According to some examples of the present disclosure, master data can concern groups of items (e.g., classifications), whereas transaction data can concern individual items. For example with respect to a collaborative information service applied in regards to a supply chain, master data might concern attributes corresponding to various kinds of stereo equipment, but the discovery service might also discover transactional data such as the actual instances of stereo equipment in the data sources and activities (e.g., sale, fabrication steps, locations, data of manufacture, component types/sources, etc.) involving the actual instances of stereo equipment.

The discovery service 584 can then run queries to the participant's data sources 572, if authorized by respective participants, to find out what kinds of corresponding master and transactional data are actually present. The information that results from the discovery service 584 is cached in a collaborative information system index (e.g., a cloud index) 586, which can be subsequently used to support the more efficient (e.g., optimized) execution of query services. For example with respect to a collaborative information service applied in regards to a supply chain, a query service is invoked by a participant to operate on a particular brand of stereo components across a number of data sources. However, since the services are defined before they are invoked by a participant, the discovery service 584 may have previously run the queries comprising the service being invoked and cached the results in the cloud index 586. Then, in response to the service being invoked by a participant causing the queries, the cache can be used to quickly find which supply chain participants have such components, rather than having to query a large quantity of possible data sources in real time.

While a single cloud index is indicated in FIG. 5 for clarity, examples of the present disclosure are not so limited. That is, the collaborative information system of the present disclosure can include more than one cloud index, and/or cloud index caching arrangement (e.g., a cloud index and associated interfaces and supporting data processing hardware and/or programmed functionality, as is further discussed with respect to FIG. 6 below).

Figure 6:
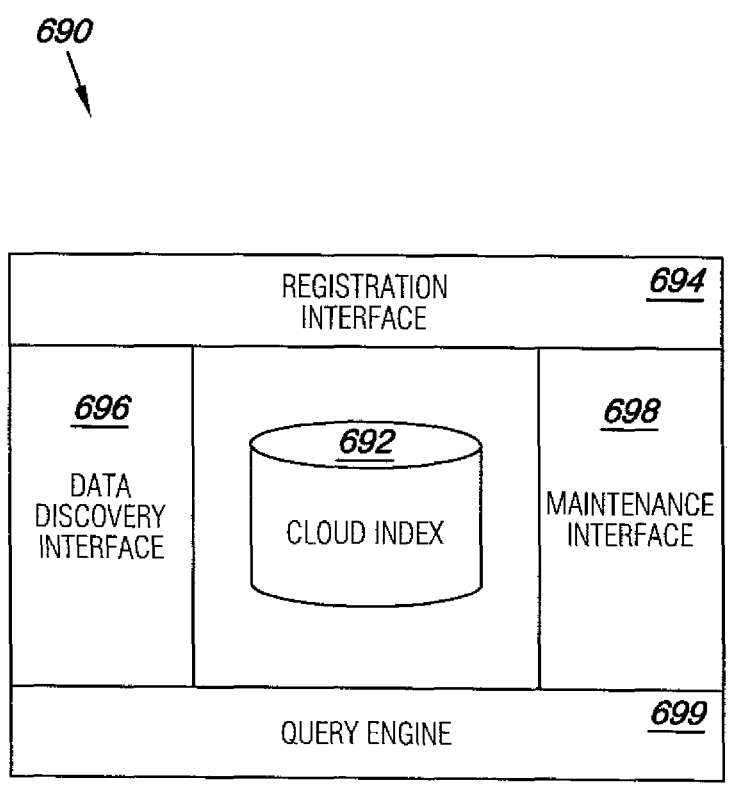
FIG. 6 is a diagram illustrating a cloud index cache arrangement according to an example of the present disclosure.

FIG. 6 is a diagram illustrating a cloud index cache arrangement according to an example of the present disclosure. The cloud index cache arrangement 690 includes a cloud index 692 communicatively coupled to each of a registration interface 694, a data discovery interface 696, a maintenance interface 698, and a query engine 699. The cloud index cache arrangement 690 supports the collaborative information services. As discussed above, the data discovery service (e.g., FIG. 5 at 584) populates the cloud index 692 with discovered information that can be used to optimize the execution of query services, for example, via a data discovery interface 696. The registration interface 694 and maintenance interface 698 may be standardized interfaces for configuring and managing the cloud index 692 respectively. The query engine 699 can be used to execute queries to populate and/or update the cloud index as may be directed by the data discovery service (e.g., FIG. 5 at 584).

A query shim (e.g., FIG. 4 at 470) can also interact with the cloud index 692 to obtain a list of data sources that may have data of interest to a query. The query shim ensures that only those data sources that have authorized the queries for the particular instance of a query service are able to provide data for the query service. Similarly, the query shim may interact with a number of cloud indexes as supported by different instances of the collaborative information services platform.

Figure 7:
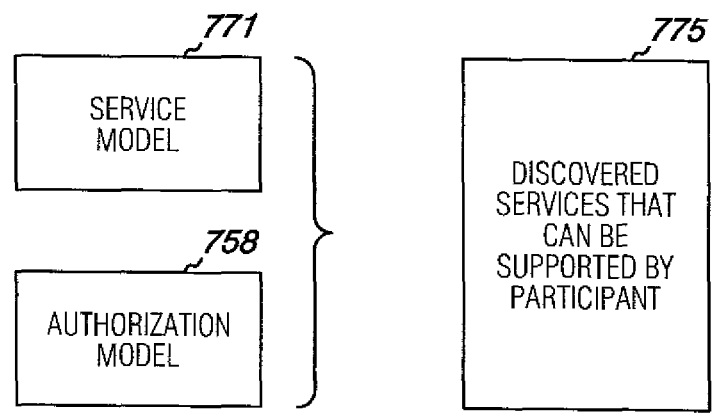
FIG. 7 is a diagram illustrating query matching according to an example of the present disclosure.

FIG. 7 is a diagram illustrating query matching according to an example of the present disclosure. A collaborative information system could expand to include up to many thousands, or more, of participants and/or data sources. A collaborative information system computing platform (e.g., FIG. 2B at 224) could eventually be programmed with many thousands, or more, of services, including query services. A service recommendation service, which includes service discovery, can help a participant become aware of what collaborative information services (e.g., additional services to those already authorized) are available to them, and how much respective effort is required before a particular one of the additional services can be authorized (e.g., implementing one or more additional queries used by an additional query service). While the discussion below illustrates the service recommendation service with respect to additional query services, the service recommendation service is not so limited, and may be applied to adopting any service available through the collaborative information system (e.g., data discovery service, serialized data service, auditing/logging service, etc.).

In order to aid participants, a service recommendation service can identify services (e.g., query services) that a particular participant can exploit based on services that the participant has already authorized. The service recommendation service can automatically discover and identify to the participant additional services that can be supported by a participant without having to share more kinds of data.

By understanding the services a participant already authorizes, as well as those additional service(s) they could support without sharing any additional data, the service recommendation service can also make a participant aware of those service they do not presently support, and/or services they could support easily. Furthermore, the service recommendation service can also inform participants as to the requirements and/or additional requirements in order to authorize additional services. That is, the service recommendation service can also inform participants as to which queries and/or query sets need to be implemented, in addition to the queries and/or query sets already authorized, to enable particular additional services to be authorized.

Previous approaches may have involved generating lists of available queries, query sets, and/or query services, perhaps along with the requirements to make each operable. A participant could then manually evaluate which features were desired without regard to incremental efforts associated with each new feature. In some previous approaches, a third party (e.g., industry organization) might determine which features (e.g., search capabilities of an information sharing system) might be worthwhile for any participant to adopt, and recommend the same to all participants. "Worthwhile" as used herein can include perceived or real utility to a particular type of participant (e.g., a member of an industry organization) and/or the cost/value of a particular service, if any. For example, a participant may be constrained by a limit on the quantity of services available to them, including constraints due to cost. A participant could then adopt the features recommended by the third party as being applicable to the class of participants to which the particular participant belonged. According to one or more of the previous approaches, incremental requirements for adopting new individual features (e.g., additional requirements beyond those already satisfied by a particular participant) were not considered.

The service recommendation service is like other services of the collaborative information system in that it has to be authorized by a participant, and, if applicable, the queries used by the service recommendation service implemented by the participant on a respective data source, before the service recommendation service can be invoked to involve a particular participant's respective data source. According to some example implementations, the service recommendation service can be invoked in a batch mode (e.g., a one time process) to evaluate existing, changed, and additional queries, query sets, and/or query services to provide recommendation(s) for new services to a participant. According to some example implementations, the service recommendation service can be invoked to continuously monitor and evaluate existing, changed, and additional queries, query sets, and/or query services to provide ongoing recommendation(s) for new services to a participant. As such, the continuous implementation can be used to advertise new services to participants. Such announcements may be customized to indicate the additional requirements corresponding to each individual participant based on an analysis of the individual participant's existing authorizations.

According to some example implementations, the service recommendation service can automatically discover which additional services can be supported by a participant without the participant having to implement more queries and/or query sets. That is, the service recommendation service can provide a participant with a report (e.g., list) of query services, for example, that are not presently authorized by the participant but that use the queries and/or query sets already implemented by the participant. The participant can then authorize additional query services without having to implement additional queries and/or query sets on a respective data source. The service recommendation service can deduce the additional query services automatically without manual evaluative effort by the participant. According to some examples of the present disclosure, the additional and/or aggregate services, as may be generated from the service recommendation service, need not incur any additional cost to a participant (e.g., where cost for queries is derived from availability of data sources for queries) where the additional and/or aggregate services do not result in exposure of any aggregate data that is disallowed by one or more of the data providers.

According to some example implementations, the service recommendation service can generate a report of additional query services that require a small number (e.g., less than X) of additional queries and/or query sets be implemented on the participant's data source(s) to support the additional query services. According to some example implementations, the service recommendation service can generate a report of additional queries and/or query sets used by a particular query service to implement on the participant's data source(s) in order to support the particular query service. The additional queries and/or query sets may, or may not, result in a change of subscription cost, efficacy, etc.

Referring to FIG. 7, a service model 771 and the authorization model 758 are used to discover services that can be supported by a participant (e.g., at 775). As previously discussed, a participant can authorize certain services (e.g., query services), which are captured in an authorization model 758. The authorization model may be configured using the service modeling service, taxonomy modeling service, and/or query/query set model (e.g., FIG. 3 at 328, 348, and 356 respectively) as described with respect to FIG. 3. The participant implements the queries and/or query sets of the authorized query services on the participant's data source(s).

The service model 771 specifies the queries and/or query sets used by respective query services (e.g., whether or not the query services are authorized by any participant). Query matching finds query services that are not yet authorized by a particular participant that can be supported by the queries and/or query sets already implemented (e.g., on the participant's data source(s)). The service recommendation service initiates the query finding process. Queries and/or query sets already implemented on participant's data source(s) can be ascertained by corresponding the authorized query services from the participant's authorization model 758 to the queries and/or query sets used by each query service, as set forth in the service model 771.

Once the queries and/or query sets that are already implemented on the participant's data source(s) are identified, they can be compared with queries and/or query sets used to implement each service in the service model 771 to determine the possible query services that use only the implemented queries and/or query sets (e.g., and do not use other non-implemented queries and/or query sets). The possible query services can then be compared to the authorized query services, set forth in the authorization model 758, to determine those possible query services that are not yet authorized.

The service recommendation service can also provide to a participant a list of other services (e.g., other than those services already authorized and those that may be authorized based on the queries and/or query sets already implemented) along with a statement for a particular other service that identifies what additional queries and/or query sets used by the particular other service would need to be implemented on the participant's data source(s) to support the particular other service. The other services can be determined from the services set forth in the service model 771 excepting the services already authorized by a participant (as set forth in the participant's authorization model 758) and the possible services (as determined above).

However, some possible services (e.g., services that may be supported by queries and/or query sets already implemented on a participant's data source(s)) may be missed because the service model specifies that a service uses queries to access data items that are already shared by the participant but found using a different query and/or set of queries. For example, a participant may be willing to allow the serial numbers of all widgets in the participants data source to be available to queries. Accordingly, the participant may implement queries to find serial numbers of those widgets manufactured before a certain date, and may implement a query to find serial numbers of widgets manufactured on or after the certain date, and may implement a logical AND combination of these two queries to arrive at all widget serial numbers, but may not have implemented a query to directly find the serial numbers of all widgets. Thus, if the service model 771 indicates that the query to directly find the serial numbers of all widgets is used by a particular service, the particular service will not be determined to be a possible service (e.g., a service that uses queries and/or query sets already implemented) since a required query is not specifically already implemented, even though the participant allows the same results to be obtained by other (e.g., different) queries and/or query sets. In order to address the above-described circumstances, some examples of the present disclosure can utilize additional and/or alternative approaches for observing data items already exposed by queries and/or query sets already implemented on a participant's data source(s), such as those described below.

Figure 8:
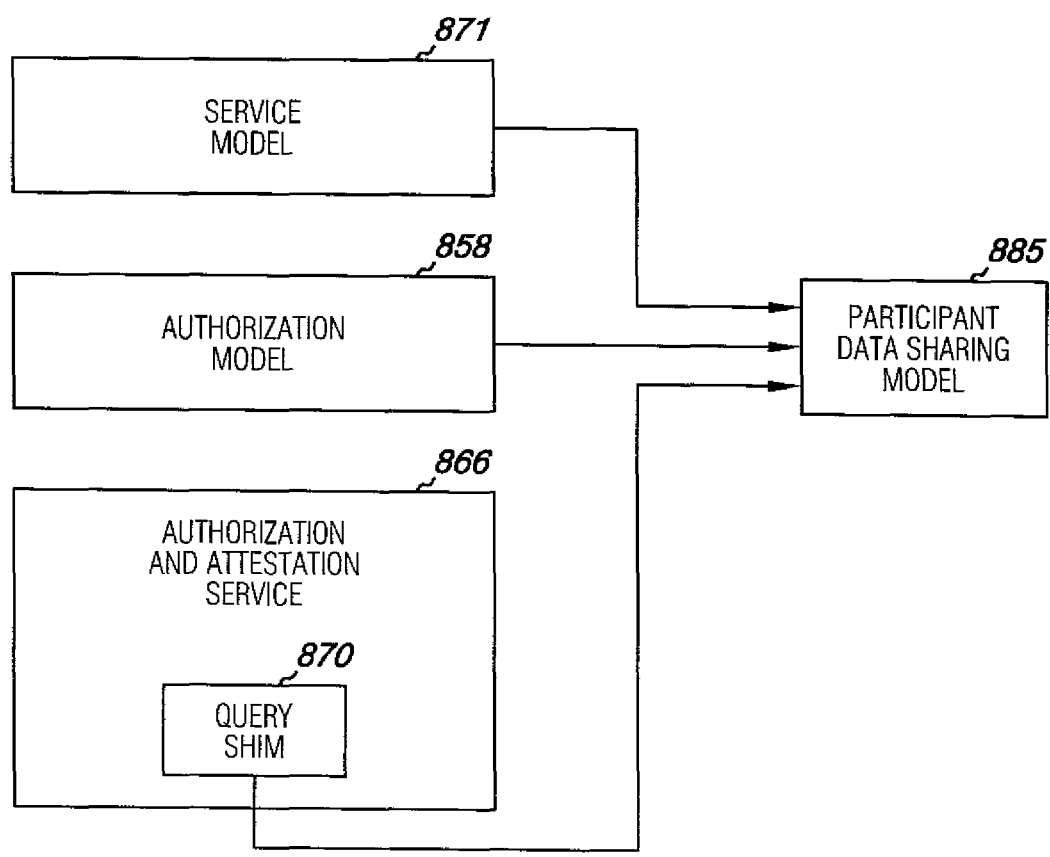
FIG. 8 is a diagram illustrating a participant data sharing model according to an example of the present disclosure.

FIG. 8 is a diagram illustrating a participant data sharing model according to an example of the present disclosure. According to some example implementations, the service recommendation service can create a participant data sharing model 885 from the service model 871, the authorization model 858, and the authorization and attestation service 866. As discussed above with respect to FIG. 7, a service model (e.g., 871) and an authorization model (e.g., 858) can be used in conjunction to determine the queries and/or query sets are used by services authorized by a participant. The participant data sharing model 885 can then be configured (e.g., populated) to indicate the data items that are shared by a participant (e.g., the portions of a data source that is allowed to be involved with query services invoked by participants to execute implemented queries and/or query sets on the participant's data source).

Some portion of the data items that are shared by a participant can be determined (e.g., observed) directly from query statements of services (e.g., query services) authorized by a participant, as set forth in the participant's authorization model 858. That is, data items that are shared by a participant can be observed directly from query statements where the query statements sufficiently identify the data items. However, some query statements may not directly identify data items, such as through use of wild card syntax.

Some portion of the data items that are shared by a participant but that do not appear in statements can be discovered from query statements as observed data items that are obtained when the query statements are executed by the query shim 870 of the authorization and attestation service 866.

As discussed above with respect to FIG. 4 (e.g., at 470) the query shim can, with respect to some data sources, facilitate communication between a query used by the services of the collaborative information system and a query to which a participant's data source will respond. For example, query language, format, syntax, and/or other attributes may be different for different data sources due to physical, programming, organizational, and/or other characteristics of a particular data source. A query shim (e.g., 470, 870) can appropriately translate a query used by a query service to a substantially equivalent query executable on a particular data source. Such translation functionality can be implemented in logic, such as by hardware and/or machine-executable instructions stored in a non-transitory medium. Yet translated query statements may still exploit a wild card syntax. Therefore, observing the results of query statements from the shim that are executed on the particular data source can provide additional information regarding the data items that are shared from the corresponding data source (e.g., by the participant). For example, observing the results of query statements from the shim that are executed on the particular data source can capture data items that may be selected by "wild card" (e.g., "*") statements in queries, which are therefore not directly observable in the query statements used by the query services (e.g., before translation by the shim 870 and before execution of the statement).

The service recommendation service, if authorized to do so by a participant, may also cause query services to be invoked, thereby causing queries, query sets, and/or query statements that have not yet been executed upon a participant's data store to be so executed in order to gain further insights into the relationship between otherwise unsupported query services, queries, query sets, and/or query statements and observed data items. Such information, in addition to data items that are already shared by a participant, may also be stored in the participant data sharing model 985 and used to further determine which additional query services, queries, query sets, and/or or query statements could be supported without the participant sharing additional data. Further checking may be required of any authorized additional query services, queries, query sets, and/or or query statements for compliance with system/service policies, as the additional query services, queries, query sets, and/or or query statements may impact costs and efficacy.

Figure 9:
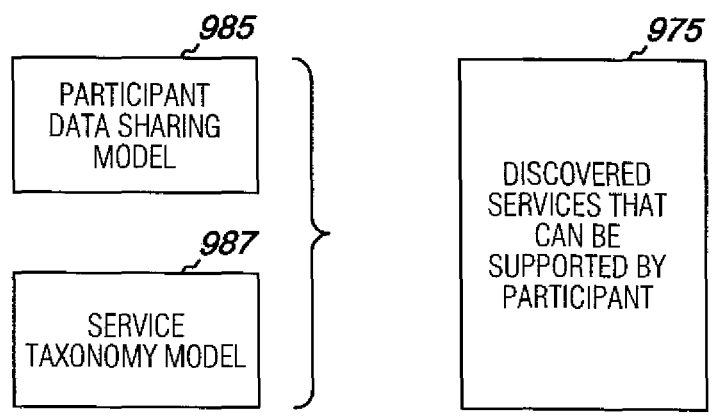
FIG. 9 is a diagram illustrating matching a participant data sharing model with query services according to an example of the present disclosure.

FIG. 9 is a diagram illustrating matching a participant data sharing model with query services according to an example of the present disclosure. The participant data sharing model 985 indicates the data items that are shared by a participant. Data items are defined within known data languages, so that the data items indicated by the data sharing model 985 can be compared with queries in the service taxonomy model 987, which establishes relationships (e.g., organization, hierarchy) between services. If all of the data items required by a service that is not yet authorized by a particular participant are already shared by the participant (e.g., via queries of authorized services, etc.), then the service is a possible service and can be added to a list of discovered services that can be supported by the participant 975 (e.g., possible services).

The list of discovered services that can be supported by the participant 975 can be presented (e.g., via indication on an electronic display, written report) to a participant, along with an indication of the additional queries and/or query sets used by the possible services for the participant to implement in support of the possible services. The additional queries and/or query sets can be indicated as involving data items from the participant's data source that the participant already shares by other queries and/or query sets.

In addition, the participant can be presented with a list of other services, along with a statement corresponding to each other service that identifies the additional data, queries, and/or query sets needed to support the respective other services. The other services can be determined from one or both of the query matching and participant data sharing model methodologies discussed above.

Figure 10:
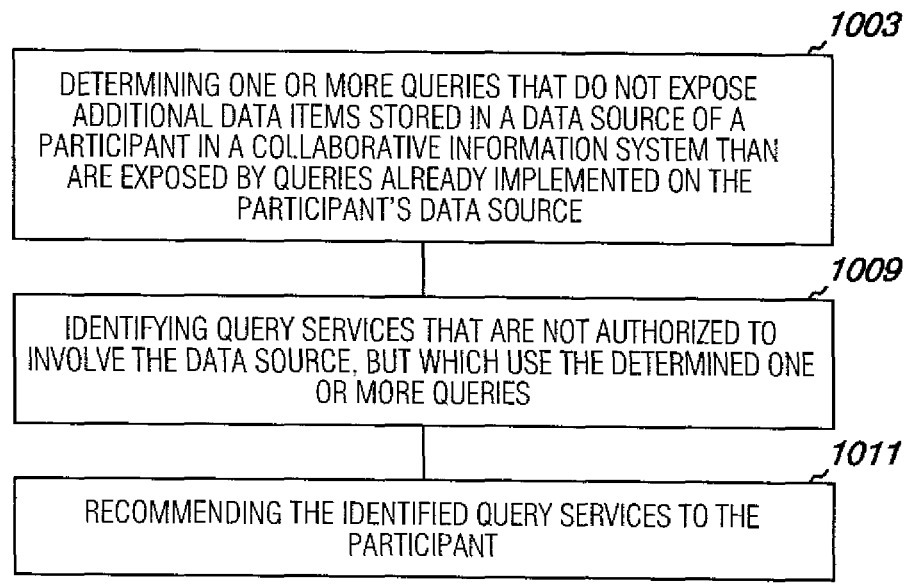
FIG. 10 is a flow chart illustrating an example of a method for service recommendation service according to an example of the present disclosure.

FIG. 10 is a flow chart illustrating an example of a method for service recommendation service 1001 according to an example of the present disclosure. The method includes determining one or more queries that do not expose additional data items stored in a data source of a participant in a collaborative information system than are exposed by queries already implemented on the participant's data source 1003. The method further includes identifying query services that are not authorized to involve the data source, but which use the determined one or more queries 1009. The method also includes recommending the identified query services to the participant 1011.

Machine readable and executable instructions and/or logic, which are operable to perform the method described in connection with FIG. 10, can be present in whole or in part in the examples of other figures. Embodiments, however, are not limited to the particular examples given herein.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

Various examples of the system and method for collaborative information services have been described in detail with reference to the drawings, where like reference numerals represent like parts and assemblies throughout the several views. Reference to various examples does not limit the scope of the system and method for displaying advertisements, which is limited just by the scope of the claims attached hereto. Additionally, any examples set forth in this specification are not intended to be limiting and merely set forth some of the many possible examples for the claimed system and method for collaborative information services.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an embodiment," as used herein does not necessarily refer to the same embodiment, although it may.

In the foregoing Detailed Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for a service recommendation service, comprising:

Determining a first set of queries that do not expose additional data items stored in a data source of a participant in a collaborative information system than are exposed by queries already implemented on the participant's data source;

Identifying a first set of query services that are not authorized to involve the data source, but which use the determined one or more queries; and Recommending the first set of identified query services to the participant;

Determining a second set of queries used by authorized query services of the collaborative information system and implemented on the data source, some portion of the data source being made available to the queries used by the authorized query services;

Identifying a second set of query services that are not authorized to involve the data source, but which use the queries already implemented on the data source;

Observing data items stored in the data source from statements of the second set of query services;

Determining, from the observed data items, additional queries that are not implemented on the data source, which search the observed data items;

Identifying additional query service that are not authorized to involve the data source, but which use the additional queries; and Recommended the identified additional query services to the participant.

2. The method of claim 1, further comprising:

Determining queries used by authorized query services of the collaborative information system and implemented on a data source, some portion of the data source being made available to the queries used by authorized query services; and identifying query services that are not authorized to involve the data source, but which use the queries implemented on the data source.

3. The method of claim 1, further comprising:

Receiving an inquiry from a participant having the data source regarding a query service of interest that is not authorized to involve the data source; and Indicating to the participant having the data source additional queries that are used by the query service of interest other than the queries already implemented on the participants data source.

4. The method of claim 3, wherein identifying query service includes comparing the additional queries to queries in a service taxonomy model.

5. A non-transitory computer readable medium memory having computer-readable instructions stored thereon that, if executed by one or more processor, cause the one or more processor to:

Determine a first set of queries that do not expose additional data items stored in a data source of a participant in a collaborative information system that are exposed by queries already implemented on the participants data source;

Identifying a first set of query services that are not authorized to involve the data source, but which use the determined one or more queries;

Recommending the first set of the identified query service to the participant;

Determining a second set of queries implemented on the data source that are used by authorized query services of the collaborative information system;

Identify second guery service that are not authorized to involve the data source, but which could be authorized by using the additional queries;

Observing data items stored in the data source from statements of the second set of queries;

Determining, from the observed data items, additional queries that are not implemented on the data source, which search the observed data items;

Identify additional query services that are not authorized to involve the data source, but which could be authorized by using the additional queries; and Recommended the identified additional query services to the participant.

6. A system for a service recommendation service, comprising:

Plurality of collaborative information participants interconnected via a communication network, each participant having zero or more data sources;

A computing platform programmed with query services, each query service defining one or more queries operable on authorized portions of participant data sources, the computing platform comprising a hardware processor and instructions, the instructions, when executed by the hardware processor are to:

determine a first set of queries that do not expose additional data items stored in a data source of a participant in a collaborative information system than are exposed by queries already implemented on a participants data source;

Identify a first set of query services that are not authorized to involve the data source, but which use the first set of queries;

Recommend the first set of identified the first set of query services to the participant;

Determine a second set of queries implemented on the data source that are used by authorized queries services of the collaborative information system;

Identify a second set of additional query services that are not authorized to involve the data source, but which could be authorized by using the additional queries;

Observe data items stored in the data source from statements of the second set of query services;

Determine, from the observed data items, additional queries that are not implemented on the data source, which search the observed data items;

Identify additional query services that are not authorized to involve the data source, but which use the additional queries; and recommend the identified additional query services to the participant.

7. The system of claim 6, wherein the instructions, when executed, are to:

determine a group of queries used by authorized query services of the collaborative information system and implemented on a data source via corresponding translated queries, some portion of the data source being made available to the translated queries, and observed data items stored in the data source from statement of the translated queries;

determine, from the observed data items, more queries that are not implemented on the data source, which search the observed data items, and identify more query services that are not authorized to involve the data source, but which use the more queries; and recommend the identified more query services to the participant.

8. The system of claim 6, wherein the service recommendation service is invoked in one of a batch mode and continuously.

9. The system of claim 6, wherein exposed data items are identified via one of directly from query statements, and as a result of an execution of a query statement.

10. The system of claim 9, wherein execution of the query statement includes passing the query through a query shim associated with a data source one which the query statement is to be executed.

11. The system of claim 6, wherein the one or more queries operable on authorized portions of a participant data sources are determined from authorization services associated with respective participant data sources.

12. The system of claim 6, wherein determining additional query services includes comparing the additional queries to queries in service taxonomy model.

* * * * *